July 14, 1931.  E. JACOBSON  1,814,041
SOLDERING IRON
Filed April 8, 1930   2 Sheets-Sheet 1
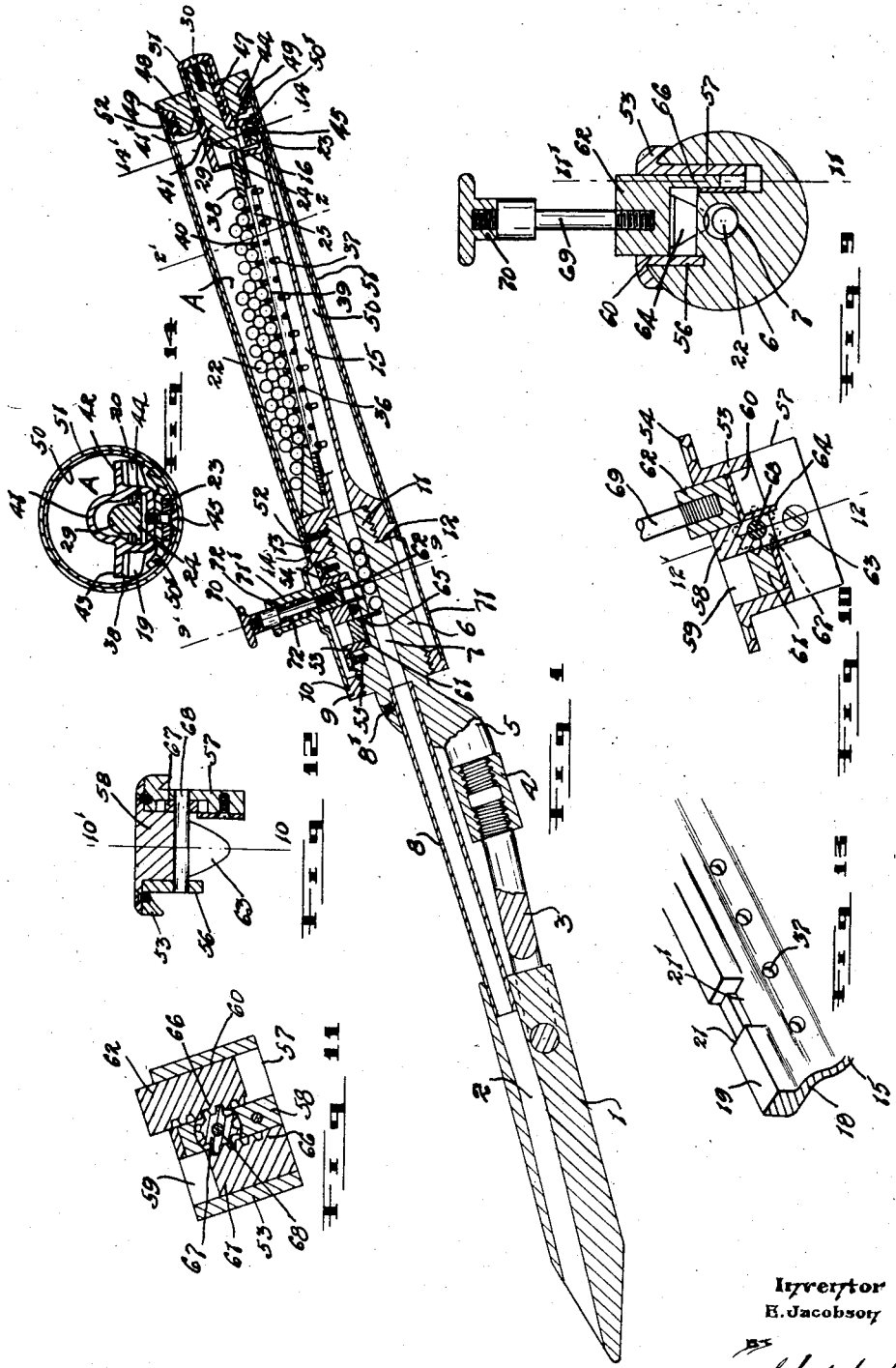
Inventor
E. Jacobson July 14, 1931.  E. JACOBSON  1,814,041
SOLDERING IRON
Filed April 8, 1930    2 Sheets-Sheet 2
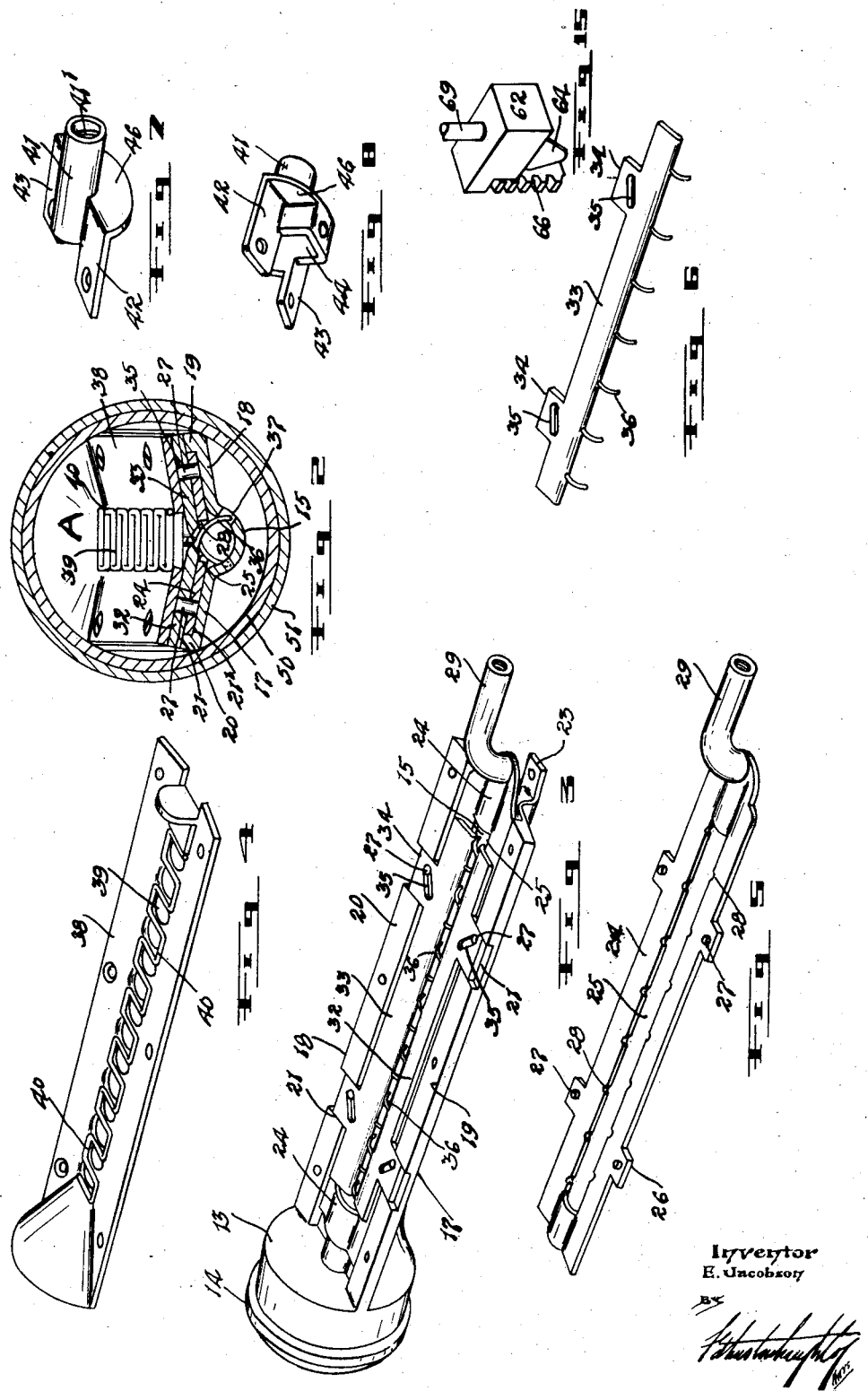
Inventor
E. Jacobson Patented July 14, 1931

1,814,041

UNITED STATES PATENT OFFICE

EDWARD JACOBSON, OF WINNIPEG, MANITOBA, CANADA

SOLDERING IRON

Application filed April 8, 1930. Serial No. 442,671.

The invention relates to improvements in soldering irons and an object of the invention is to provide a soldering iron having a compartment or storage chamber for a plurality of soldering pellets or balls and to arrange the construction so that the user can feed the pellets one at a time as and when desired to the point of the iron, the liberated pellet melting under the heat of the point and being used for soldering purposes in the usual manner.

A further object of the invention is to provide a construction which avoids any possibility of the pellets clogging, that is to say, an iron which can at all times be relied upon to feed a pellet when desired to the heated point.

A further object of the invention is to provide a soldering iron having a storage chamber for pellets, a feed passage underlying the storage chamber and in direct communication with the point of the iron, means for permitting a fixed number of pellets to pass from the storage chamber into the passage at the desire of the user and to the exclusion of the remaining pellets in the chamber and means whereby a single pellet can be selected and fed to the point of the iron.

A further object of the invention is to construct the device in a simple, durable and inexpansive manner and so that the various parts can be readily assembled or if desired taken apart for inspection or repair purposes.

With the above more important and other minor objects in view which will become more apparent as the description proceeds, the invention consists essentially in the arrangement and construction of parts hereinafter more particularly described, reference being had to the accompanying drawings, in which:—

Fig. 1 is a vertical longitudinal sectional view passing centrally through the soldering iron.

Fig. 2 is an enlarged detailed vertical sectional view at 2—2' Figure 1.

Fig. 3 is a perspective view of the trough, collar carrying the trough and the forked bars.

Fig. 4 is a perspective view of the cover plate.

Fig. 5 is a perspective view of the sliding frame.

Fig. 6 is a perspective view of one of the forked bars.

Figs. 7 and 8 are perspective views from different vantage points of the flanged sleeve.

Fig. 9 is an enlarged detailed vertical cross sectional view at 9—9' Figure 1.

Fig. 10 is a vertical longitudinal sectional view through the box and associated parts, the section being taken in the plane denoted by the line 10—10' Figure 12.

Fig. 11 is a vertical longitudinal sectional view at 11—11' Figure 9.

Fig. 12 is a vertical cross sectional view at 12—12' Figure 10.

Fig. 13 is a perspective view of a portion of one of the flanges of the trough.

Fig. 14 is an enlarged detailed vertical sectional view at 14—14' Figure 1 and looking inwardly.

Fig. 15 is a perspective view of one of the plungers and the gate carried thereby.

In the drawings like characters of reference indicate corresponding parts in the several figures.

The iron 1 is of the customary shape having the forward end pointed for solding purposes and it is supplied in the upper part with a lengthwise extending passage 2 which opens to the point in the manner best shown in Figure 1, the passage being preferably circular in cross section.

A supporting shank 3 is permanently fastened to the inner or heel end of the iron and the shank is provided with a left hand thread which receives a coupling sleeve 4 detachably fastening it to the threaded end of a second shank 5, the thread of the latter shank being a right hand one. The shank 5 extends from a head 6 and is offset as shown and the head is provided with a centrally located lengthwise extending passage 7, the forward end of which communicates with a feed tube 8 leading to the passage 2.

The tube 8 has the rear end thereof slidably inserted in the shank 5 and held by a jam screw 8' and the front end thereof slidably entering the rear end of the passage 2 and the arrangement is such that the iron 1 can be dismounted by undoing the jam screw 8' and turning the coupling sleeve 4.

The head 6 has the front end exteriorly screw threaded to receive an annular collar 9 provided with a circumscribing ledge 10 and the rear end of the head is reduced to provide an extending exteriorly screw threaded nipple 11 and a shoulder 12. On the nipple, I screw thread a further collar 13 provided with a circumscribing rib 14 and the collar carries an extending inclined trough 15 having the outer end closed by a cross web 16 and the inner end communicating through the head 13 with the passage 7. The trough is supplied with laterally extending side wings 17 and 18 which converge slightly downwardly towards the trough and the upper faces of the wings are provided at their outer edges with lengthwise extending integrally formed side strips 19 and 20 which are cross slotted at intervals as indicated at 21 and in a step like manner as best shown in Figure 13 to provide guides for side lugs later described.

I might here explain in order that the description may be more readily followed that in accordance with the invention, there is a magazine from which shot like soldering pellets or balls 22 are fed into the trough and that the balls run from the trough through the passage 7, tube 8 and passage 2 to the point of the iron and that in the passage 7 a mechanism is provided which is controlled by the operator to permit only one ball to feed ahead to the iron at a time.

When the iron is in use, it is naturally held in an inclined position such as shown in Figure 1 so that the balls will run by gravity from the trough into the passage 7 and from the passage 7 when released to the tube 8 and passage 2.

The end of the trough remote from the head 6 is supplied with an extending lug 23 utilized for a purpose later disclosed. The side wings support for endwise sliding movement, a substantially rectangular sliding frame 24 provided with a longitudinally extending central slot 25 overlying the trough and of a width such that it will not in any way interfere with the pellets or balls dropping down therethrough into the trough. The sliding frame is provided at its edges with extending lugs 26 which enter the lowermost portions 21' (see Figure 13) of the step like slots 21, the portions 21' of the slots being long enough to permit the lugs endwise sliding movement therein. Each of the lugs 26 is provided with an upstanding pin 27 and the inner edges of the slot 25 are fitted at intervals with notches 28, the notches at the opposite sides of the slots being in staggered relation as best shown in Figure 5.

The end of the frame remote from the head 6 carries a push rod 29 having an elbow like inner end connected centrally to the outer end of the frame and the outer end of the push rod is screw threaded to receive a screw 30 which fastens a socket like finger piece 31 to the rod. The body of the rod is axially aligned with the centre of the passage 7.

On the upper face of the frame 24, I mount for in and out sliding movement a pair of opposing bars 32 and 33, such bars having their upper faces approximately flush with the upper faces of the strips 19 and 20 and being provided at their outer edges with similar side lugs 34 which slidably enter the upper portions of the slots 21, the latter lugs being constrained by the slots to an in and out sliding movement. Each of the lugs 34 is fitted with an angular slot 35 which receives the pin 27 carried by the underlying lug 26 and the arrangement is such that when the push rod 29 is in pushed, it shifts the sliding frame 24 towards the collar 13 and such movement causes through the shifting of the pins 27 an out travel of the bars 32 and 33, this latter being obviously effected by the movement of the pins 27 in the slots 35.

Provision later described is made for returning the bars 32 and 33 to their inner positions with the pins 27 at the outer ends of the slots 35 and in such a position of the bars, the inner edges of said bars are close enough together to prevent any pellets dropping through the slot 25 into the trough. The inner edges of the bars 32 and 33 have their upper corners rounded off so that the overlying pellets have a natural tendency to gravitate to a position resting on the inner edges of the bars and at this point it will be also noted that the side portions of the frame 24 as well as the overlying bars 32 and 33 are both slightly tilted inwardly, this conforming to the tilted position of the wings 17 and 18 hereinbefore mentioned.

The inner edges of the bars 32 and 33 are each provided with a series of extending downturned hooks or fingers 36, the series of hooks being alternated in position and adjacent hooks being positioned apart a distance slightly greater than the diameter of a pellet or ball.

When the bars 32 and 33 are in their closed or inner positions, the hooks enter the notches 28 hereinbefore mentioned and the extending ends of the hooks are received within holes 37 provided in the sides of the trough. These latter holes and the notches 28 simply accommodate the hooks so that they will in no way interfere with the closing of the bars 32 and 33 and also they insure that the sets of hooks will be sufficiently spread in the closed positions of the bars to allow pellets resting in the trough to roll endwise in the trough clear of the hooks. Further in regard to the hooks, I wish to point out that when the bars 32 and 33 are in their out position, they provide a space therebetween to allow the pellets to drop down through the slot 25 into the trough and at such time the lower ends of the hooks are overlying the centre portion of the trough and prevent the pellets resting in the trough from moving endwise as at such time there will actually be a hook between adjoining pellets in the trough. Subsequently when the push rod is released and the bars 32 and 33 close in, the hooks will pass from between the pellets and allow the same to run freely in the trough.

To the strips 19 and 20, I secure a cover plate 38 which plate actually forms the bottom of the storage chamber A for the pellets and the cover plate is provided with a series of pellet escape openings 39. A continuous zig-zag rib 40 extends alternately backwardly and forwardly between the openings 39 and this rib acts to feed the balls to the openings from alternate sides. The hooks or fingers 36 underlie the cross going portions of the rib.

The push rod 29 is slidably received within a sleeve 41 and this sleeve is supplied with side flanges 42 and 43 (see Figures 7, 8 and 14) which overlie the adjacent end of the cover plate and are fastened thereto. The said sleeve is also supplied at the under side with a socket 44 receiving the down turned end of the push rod and the base of the socket is fastened by a screw 45 to the lug 23, this screw also passing through other parts later described. The sleeve 41 carries also a rear semicircular flange 46 which forms the outer end wall of the socket and extends to prevent the pellets or balls getting underneath the trough when they are being poured in as later explained.

A coiled spring 47 is placed on the push rod and has one end engaging an internal shoulder 41' formed in the sleeve and the other end entered in the socket like finger piece 31, the spring acting to hold the finger piece in its out position at which time, the bars 32 and 33 are in a position best shown in Figure 2. A screw plug 48 is slidably mounted on the sleeve 41 and the plug screw threads in the collar 49 and the collar is stepped to receive the adjoining ends of an inner metallic cylindrical casing 50 and an outer cylindrical insulating casing 51. The other ends of these casings are mounted on the collar 13 butting the rib 14 and both casings are fastened to the collars 13 and 49 by screws 52. The cylindrical casings form a handle for the device and provide in conjunction with the plate 38 the storage chamber A. The outer end of the inner casing 50 is provided at the under side with a strap 50' which receives the screw 45 and takes a position between the lug 23 and the base of the socket 44. The screw 45 also passes through the inner casing fastening it to the adjoining parts.

In order to fill the magazine, one unscrews and removes the plug 48 and at this time a somewhat crescent shaped entrance opening will be exposed at the end of the handle above the sleeve 41 and the flanges 42 and 43 and the lower area is at this time closed by the flange 46 which as before stated prevents the pellets or balls from getting in underneath the trough when they are being poured into the magazine through the somewhat crescent shaped opening mentioned. After the pellets have been entered, the plug is screwed into its original position.

It is desirable that the operator can control the pellets or balls passing to the point of the iron and to this end I provide the head 6 with means for releasing one pellet at a time to pass down the head, said means being controlled by the depression of a thumb piece provided. The head 6 is cut away at the upper side to receive a box 53 fitted with end flanges 54 secured by screws 55 to the head. The box has a relatively short side wall 56 and a somewhat longer opposing side wall 57 and is divided by a cross partition or web 58 between the latter walls. The cross partition forms with the box two vertically disposed guideways 59 and 60 for sliding plungers 61 and 62 and the plungers carry on their under sides downwardly extending tongue shaped gates 63 and 64 which are adapted in the down movement of the plungers to pass through cross slots 65 cut in the head and enter the passage 7. The distance which the gates are apart is somewhat greater than the diameter of a pellet and provision is made so that the gates alternately raise and lower.

This latter is accomplished by forming a downwardly extending rack bar 66 at the end of each plunger and inserting a pinion 67 between the rack bars and engaging the teeth thereof, the pinion being housed in a suitable cavity provided in the web 58 and being mounted on a pivot pin 68 carried by the web. A push pin 69 screw threads into one of the plungers and is provided at the outer end with a thumb piece 70. A sleeve 71 surrounds the head 6 being carried by the collars 9 and 13 and the sleeve is provided at the upper side with an extending boss 71' which contains a coiled spring 72 surrounding the pin 69 and having the inner end thereof engaging an internal seat formed at the base of the boss and the upper end thereof engaging the thumb piece. The spring acts to normally hold the plunger 62 in its up position as shown best in Figures 1 and 10 and accordly the plunger 61 is in its down position.

It will be observed that in the up position, the gate 64 is withdrawn from the passage 7 while the gate 63 crosses the passage. Accordingly any balls admitted into the trough 15 and rolled into the passage 7 will be stopped by the gate 63. Subsequently should the thumb piece 70 be depressed, the gate 64 will cross the passage 7 immediately to the rear of the leading ball while the gate 63 will rise to free the leading ball to roll down the tube 8 into the passage 2 of the iron. Subsequently upon the thumb piece 70 being released, the gates will take a reversed position and the balls will be stopped by the gate 63 in the manner as shown in Figure 1.

The above completes the description of the parts but in order that the device as a whole may be better understood, I will now give a brief description of the way in which the iron is used.

To charge the iron, one unscrews the plug 48 and pours a considerable number of pellets or balls into the storage chamber after which time, the plug is screwed back into place. The user then presses the finger piece 31 inwardly and this permits a fixed number of pellets to drop down into the trough, the number of pellets dropped being one less than the number of fingers or hooks 36. The fingers insure that only a fixed number of pellets will drop into the trough and as long as the finger piece 31 is held in, the pellets cannot roll down the trough as they are prevented from so doing by the fingers, there being a finger at such time between adjoining pellets separating them and positioned more or less centrally of the trough.

Upon finger pressure being released from the finger piece, the spring 47 moves the finger piece out and closes the bars 32 and 33 together and as the bars close, the sets of fingers spread and the balls passed into the trough are accordingly freed to roll endwise in the trough. The closing of the bars prevents any further balls or pellets dropping down until such time that the user again presses the finger piece 31. As the iron is used in an inclined position, the balls dropped into the trough naturally roll towards the head 3 and are there stopped by the gate 63. The iron is then set ready for use and the point can be heated to a proper heat in the usual manner. When the proper heat is obtained, the user proceeds with the work of soldering and at this time, he will press the thumb piece 70 to release one ball or pellet. This ball will run down the tube 8 and passage 2 and will become melted and be used for soldering purposes.

Further balls can be passed down as the user desires by the simple depression of the thumb piece 70. After all the balls admitted to the trough have been used, the trough can be replenished with another charge by pressing in the finger piece 31.

What I claim as my invention is:—

1. In a soldering iron, a handle having contained therein a magazine for receiving pellets of solder, a trough shaped member underlying the magazine and passing lengthwise within the handle, a pointed iron carried by the forward end of the handle, there being a pellet passage leading from the point of the iron and communicating with the forward end of the trough shaped member, manually actuated means permitting a predetermined number of pellets to escape from the magazine and enter the trough and manually actuated means for feeding the pellets one at a time through the passage to the pointed end of the iron.

2. In a soldering iron, a handle containing a magazine for receiving pellets of solder, said magazine having the bottom thereof provided with a plurality of pellet escape openings, a trough shaped member extending longitudinally of the handle and underlying said escape openings, a pointed iron carried by the forward end of the handle, there being a pellet feed passage leading from the forward end of the point to the forward end of the trough, manually actuated means normally preventing premature escape of the pellets through the feed openings into the trough and manually actuated means for selectively feeding one pellet at a time through the feed passage.

3. In a soldering iron, a handle containing a magazine for receiving pellets of solder, said magazine having the bottom thereof provided with a plurality of pellet escape openings, a trough shaped member extending longitudinally of the handle and underlying said escape openings, a pointed iron carried by the forward end of the handle, there being a pellet feed passage leading from the forward end of the point to the forward end of the trough, manually actuated means normally preventing premature escape of the pellets through the feed openings into the trough, means associated with said latter means for separating the pellets in the trough and manually actuated means for feeding the pellets one at a time through the feed passage to the point of the iron.

4. In a soldering iron, a handle having an interior magazine for the reception of soldering pellets, the bottom of the magazine being provided with a plurality of pellet escape openings arranged longitudinally of the magazine, a trough shaped member contained within the handle and underlying the pellet escape openings, a pair of bars interposed between the escape openings and the trough and outwardly and inwardly slidable, manually operated means for actuating the bars to open or closed positions, said bars in their open position permitting of the escape of pellets into the trough and in their closed position preventing the same, alternated fingers carried by the bars and adapted in the open position of said bars to space the pellets admitted to the trough and in the closed position of the bars to clear the pellets in the trough, a pointed iron carried by the forward end of the handle, there being a pellet feed passage leading from the point of the iron to the forward end of the trough and manually actuated means for feeding one pellet at a time through the feed passage to the point of the iron.

5. In a soldering iron, a magazine for pellets of solder having a flattened V-shaped bottom, a longitudinally extending row of pellet escape openings formed centrally in the bottom and a guarding rib zig-zagging alternately backwardly and forwardly between the escape openings.

Signed at Winnipeg, this 7th day of November, 1929.

EDWARD JACOBSON.